June 25, 1963

E. DRYDEN 3,095,233

VEHICLE SUN VISOR MEANS HAVING A MAIN SHIELD MOUNTING A
HORIZONTALLY SLIDINGLY POSITIONALLY
CHANGEABLE AUXILIARY SHIELD

Filed Feb. 20, 1961

INVENTOR.
EVA DRYDEN

June 25, 1963  E. DRYDEN  3,095,233
VEHICLE SUN VISOR MEANS HAVING A MAIN SHIELD MOUNTING A
HORIZONTALLY SLIDINGLY POSITIONALLY
CHANGEABLE AUXILIARY SHIELD
Filed Feb. 20, 1961  2 Sheets-Sheet 2

*INVENTOR.*
EVA DRYDEN

United States Patent Office 3,095,233
Patented June 25, 1963

3,095,233
VEHICLE SUN VISOR MEANS HAVING A MAIN SHIELD MOUNTING A HORIZONTALLY SLIDINGLY POSITIONALLY CHANGEABLE AUXILIARY SHIELD
Eva Dryden, 11952 Cantara St., North Hollywood, Calif.
Filed Feb. 20, 1961, Ser. No. 90,268
5 Claims. (Cl. 296—97)

The present invention consists of improved vehicle sun visor means for a vehicle such as an automobile, or the like, although not specifically so limited. The improved vehicle sun visor means of the present invention includes a main glare shield effectively mounting a horizontally slidingly positionally adjustable or changeable auxiliary shield whereby to provide a structural arrangement which can be effectively repositioned and/or adjusted in a manner such as to effectively shield the eyes of a driver of an automobile, or the like, under virtually any type of glare conditions.

It should be noted that the present invention comprises an improvement over the vehicle sun visor having two end-for-end positionally interchangeable shields as disclosed in my U.S. Patent No. 2,965,416, granted on December 20, 1960. Furthermore, it should be clearly noted that the present invention patentably distinguishes from said earlier patent by reason of the novel structural distinctions of the present invention, as set forth in detail hereinafter and as illustrated in detail in the accompanying drawings.

It is an object of the present invention to provide an improved vehicle sun visor means including a main shield and an auxiliary shield which is horizontally positionally slidingly adjustable or changeable with respect to the main shield whereby to provide virtually any desired type and/or combination of glare-shielding effects desired.

It is a further object of the present invention to provide improved vehicle sun visor means of the type referred to above which is of extremely simple, cheap, foolproof construction such as to be conducive to widespread use thereof.

Further objects are implicit in the detailed description which follows hereinafter, for exemplary purposes only and not for limiting purposes, and will be apparent to persons skilled in the art after a careful study thereof.

For the purpose of clarifying the nature of the present invention, several exemplary embodiments are illustrated in the hereinbelow-described figures of the accompanying drawings and are described in detail hereinafter.

Figure 1:
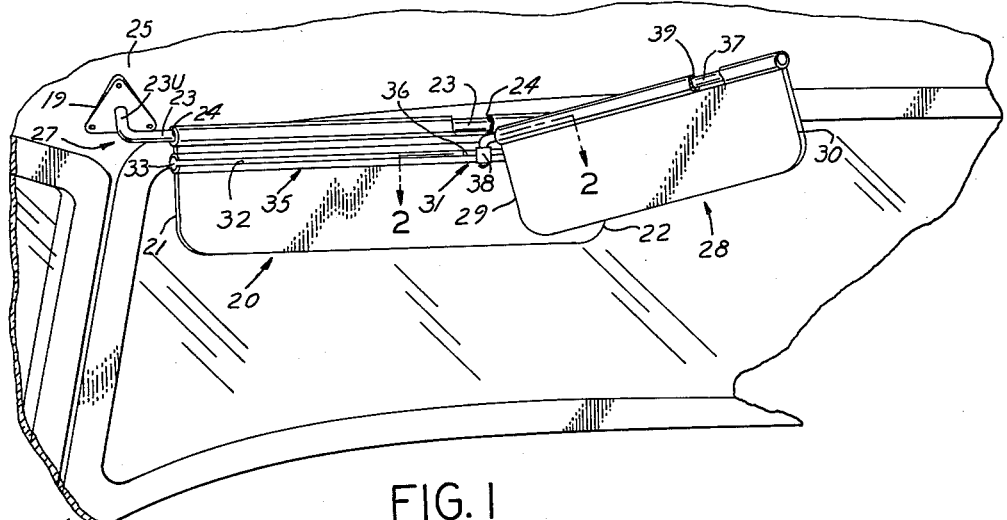
FIG. 1 is a fragmentary, partially-broken-away perspective view illustrating one exemplary embodiment of the present invention in mounted operative relationship with respect to a vehicle comprising an automobile.
Figure 2:
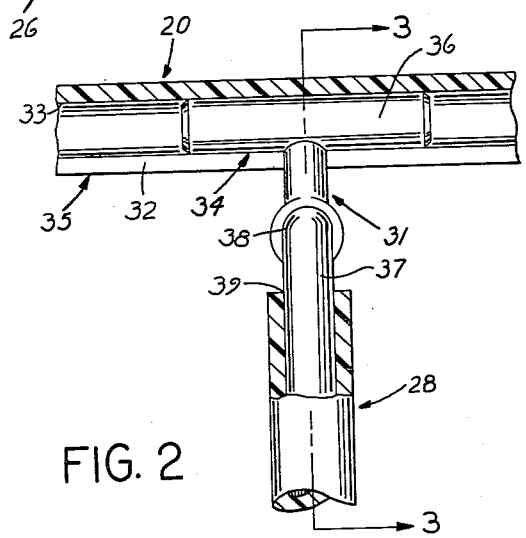
FIG. 2 is an enlarged, fragmentary, partially-broken-away, staggered plane, sectional view taken in the direction of the arrows 2—2 of FIG. 1.
Figure 3:
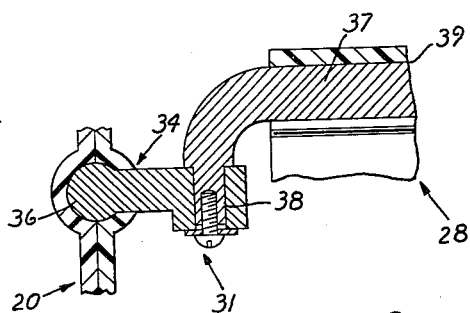
FIG. 3 is a fragmentary, partially sectional view taken in the direction of the arrows 3—3 of FIG. 2.

Referring to FIGS. 1–3 for exemplary purposes, one illustrative embodiment of the invention is shown in a form including a first or main glare shield, indicated generally at 20 which, in the form illustrated, is of substantially flat, substantially rectangular shape (with rounded lower corners) having what may be termed a first end 21 and a second end 22. However, it should be clearly noted at this point that the precise configuration and structure of the glare shield 20 is not specifically limited to the substantially flat, substantially rectangular configuration illustrated.

The glare shield 20 may be made of any suitable material and is adapted to be provided with means for effectively and adjustably mounting it at a desired location, usually adjacent the front windshield and side window of an automobile, although not specifically so limited.

In the form of the invention illustrated in FIGS. 1–3, said means for mounting the first or main glare shield 20 in an adjustable manner comprises a support arm 23 and aperture-defining means 24 receiving the support arm 23.

In the form illustrated, the outwardly projecting end of the support arm 23 is directed upwardly as indicated at 23U and is adapted to be fastened by the mounting bracket means, indicated at 19, at any desired location, as, for example, in the form of the invention illustrated in FIGS. 1–3, the front upper inside corner portion 25 of an automobile body, indicated generally at 26.

In the specific exemplary form illustrated in FIGS. 1–3, the mounting means just described is designated generally by the reference numeral 27 and effectively mounts the first or main glare shield 20 for arcuate pivotal movement around the axis of the upwardly extended portion 23U of the support arm whereby it can be adjusted into any desired position around said vertical axis.

Also, in the exemplary form of the invention illustrated in FIGS. 1–3, the mounting arrangement just described above effectively mounts the first or main glare shield 20 for rotation around the longitudinal axis of the support rod 23 (which may be substantially horizontal or which may be angularly displaced from the true horizontal in certain instances). This latter feature is accomplished by reason of the fact that, in the exemplary form illustrated in FIGS. 1–3, the supporting rod 23 is of round cross-sectional configuration and the aperture-defining portion 24 carried by the first or main glare shield 20 is similarly of round cross-sectional configuration and of a size such as to frictionally grip the support rod 23 whereby to remain in any adjusted position until manually readjusted. This frictional positional retention feature is also true of the rotative engagement of the upwardly directed portion 23U with respect to the mounting bracket means 19 which may be of any conventional type of construction or which may be of the type of construction illustrated in FIG. 2 of my above-mentioned granted patent. In view of this, no further detail of the interior features of the mounting bracket means 19 is thought necessary.

It should particularly be noted at this point that it is not necessary in all instances that the support rod 23 be round and the aperture-defining portion 24 be similarly round, although in one preferred form of the invention this construction is employed as illustrated in FIGS. 1-3.

The exemplary form of the invention illustrated in FIGS. 1-3 also includes a second or auxiliary glare shield, such as is indicated generally at 28 for exemplary purposes, and which, in the particular form illustrated, is of substantially flat, substantially rectangular (with rounded lower corners) configuration having what might be termed a first end 29 and a second end 30. It should be specifically noted at this point that the second or auxiliary glare shield 28 is not specifically limited to the substantially flat, substantially rectangular configuration illustrated, but may take various other forms.

It should also be noted that either or both of the first and/or second glare shields 20 and 28 may be of opaque or partially light-transmissive material in various different forms of the invention whereby to provide any desired type of glare-shielding effect.

The exemplary form of the invention illustrated in FIGS. 1-3 also includes means for adjustably mounting the second or auxiliary glare shield 28 with respect to the first or main glare shield 20. In the form illustrated, this adjustable mounting means is of a type arranged to provide for controllably positionable adjustment of the second or auxiliary glare shield 28 with respect to the first or main glare shield 20 along a longitudinal junction line extending along the length of the first or main glare shield 20.

In the form illustrated, this above-mentioned adjustable mounting means is designated generally by the reference numeral 31 and the junction line referred to is indicated by the reference numeral 32 and actually comprises a longitudinal slot in a longitudinal aperture-defining portion 33 carried by the first or main glare shield 20.

In the form illustrated in FIGS. 1-3, said longitudinal aperture-defining portion 33 lies immediately below the longitudinal aperture-defining portion 24. However, this is illustrative only and the invention is not limited to this specific arrangement. Actually, either of the aperture-defining portions may be differently positioned and/or located with respect to the first glare shield 20 and/or with respect to each other.

Also, in the specific form of the invention illustrated in FIGS. 1-3, said adjustable mounting means 31 includes slidable engagement means, such as designated by the reference numeral 34 in the form of the invention illustrated in FIGS. 1-3, in slidable engagement with the longitudinal junction means, indicated generally at 35 and comprising the aperture-defining portion 33 and the slot 32. This provides an arrangement whereby the slidable engagement means 34 can be slidably moved along the length of the slot 32 and aperture 33 for positioning at any desired location along the length of the first glare shield 20. It should be noted that the engagement of the slidable engagement means 34 and the junction means 35 is of a frictional type such as to frictionally retain them in any adjusted position until manual readjustment thereof.

It should also be noted that, in the exemplary form of the invention illustrated in FIGS. 1-3, the slidable engagement means 34 includes a member 36 which is of round cross-sectional configuration and which is slidably received within the aperture-defining portion 33 which is also of round cross-sectional configuration. However, it should be specifically noted at this point that the invention is not limited to this particular arrangement, and non-round structure and/or engagement of these mating portions may be provided in certain forms of the invention, if desired.

It should be noted that the slidable engagement means 34 includes an extension arm or a longitudinal support member 37 pivotally attached thereto at 38 and adapted to support the second or auxiliary glare shield 28. In the specific form of the invention illustrated, this is provided by means of an aperture-defining portion 39 carried by the second glare shield 28 and receiving the support rod 37 therein.

It should additionally be noted that, in the specific form illustrated in FIGS. 1-3, the engagement of the second or auxiliary glare shield 28 with respect to the support rod or arm 37 is of a rotative and longitudinally slidably extendable nature by reason of the round cross-sectional configuration of the support rod 37 and the corresponding mating round cross-sectional configuration of the aperture-defining portion 39—the engagement therebetween being sufficiently tight so as to provide for frictional retention of position of the second glare shield 28 in any adjusted position until manually readjusted. However, it should be clearly noted at this point that the support arm 37 and aperture-defining portion 39 may be of configurations other than round and may be either non-rotatively engaged and/or non-slidably extendably engaged in certain forms of the invention.

It should be clearly noted that the extension arm or support rod 37 and aperture-defining portion 39 may be positioned at any desired location with respect to the second glare shield 28, the first glare shield 20 and/or either of the aperture-defining portions 24 and/or 33 carried by the first glare shield 20. In other words, the invention is not limited to the arrangement shown in FIGS. 1-3 wherein the aperture-defining portion 24 is positioned at the top of the first glare shield 20, the aperture-defining portion 33 is positioned immediately therebelow, and the aperture-defining portion 39 of the second glare shield 28 is positioned at the top thereof. Any desired positional rearrangement of these elements may be provided in various different specific embodiments of the present invention within the basic scope of the present invention.

It will be noted that the arrangement described above in detail in connection with the first form of the invention illustrated in FIGS. 1-3 provides an arrangement which allows controllable adjustment and/or selective positioning of both of the glare shields in a great variety of different ways such as to provide virtually any desired type of glare protection for the driver of a vehicle or other person subjected to glare.

Figure 5:
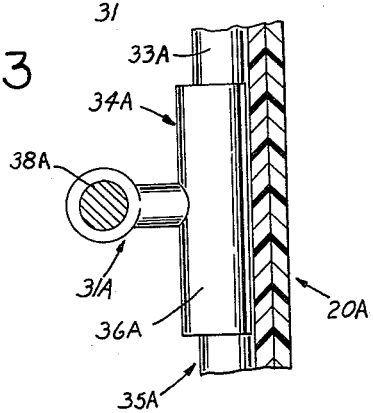
FIG. 5 is a view similar to FIG. 2, but illustrates the modified form of the invention shown in FIG. 4.
Figure 4:
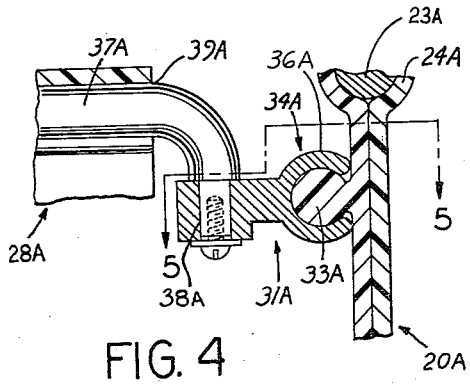
FIG. 4 is a view similar to FIG. 3, but illustrates a slightly modified form of the invention.

FIGS. 4 and 5 illustrate a slightly modified form of the adjustable engaging means indicated generally at 31 in the first form of the invention and indicated at 31A in this modified form of the invention.

In this modified form, the longitudinal junction means 35A carried by the first glare shield 20A comprises longitudinal projecting track means 33A, and the slidable engagement means 34A comprises engaging and encompassing track follower means 36A slidably positioned on the projecting track means 33A in a frictionally longitudinally slidably adjustable manner for controllable positioning in any desired manner along the length of the first glare shield 20A. The extension arm 37A is pivotally attached to the member 36A as indicated at 38A whereby to provide for virtually any desired type of positional relative adjustment of the glare shields.

It should be clearly noted that the projecting track means 33A is not limited to the substantially round configuration shown in FIGS. 4 and 5 but may assume various other non-round configurations in which case the engaging and encompassing track follower means 36A comprising the slidable engagement means 34A will necessarily assume substantially the same interior configuration for frictional engagement with the projecting track means 33A. Parts of this modification which correspond to those previously described are indicated by similar reference numerals, followed by the letter "A," however.

Figure 6:
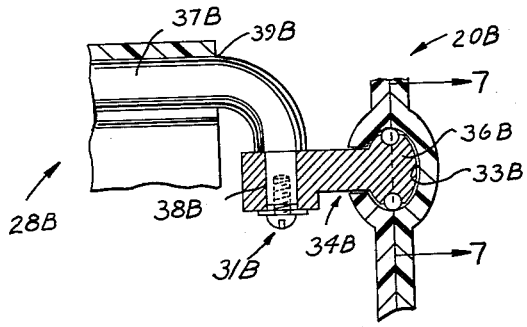
FIG. 6 is a view generally similar to FIGS. 3 and 4, but illustrates a further modified form of the invention.
Figure 7:
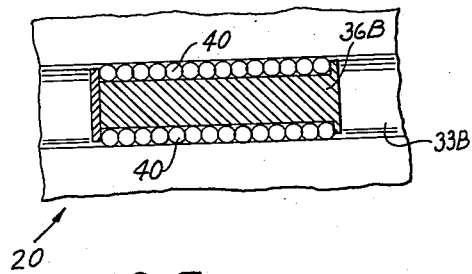
FIG. 7 is a fragmentary, partially-broken-away and partially sectional view taken in the direction of the arrows 7—7 of FIG. 6.

FIGS. 6 and 7 illustrate a further modification wherein the slidable engagement means is designated by the reference numeral 34B and comprises a member 36B lying in the non-round aperture-defining portion 33B and provided with ball bearing means or other suitable antifriction means, such as indicated at 40, for facilitating the longitudinal slidably positional readjustment of the slidable engagement means 34B. Parts of this modification which correspond to those previously described are indicated by similar reference numerals, followed by the letter "B," however.

Figure 8:
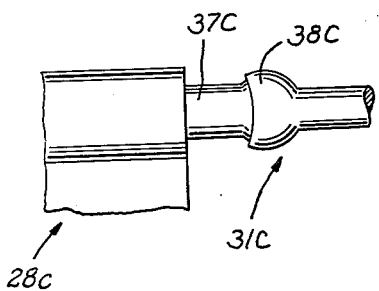
FIG. 8 is a fragmentary, partially-broken-away elevational view taken from the same aspect as FIGS. 3, 4, and 6, but illustrates a modified type of pivotal connection means comprising a universal joint construction.

FIG. 8 illustrates a slight modification of the pivotal mounting arrangement indicated by the reference numeral 38 in the first form of the invention, indicated by the reference numeral 38A in the second form of the invention, and indicated by the reference numeral 38B in the third form of the invention. In the modification shown in part in FIG. 8, said pivotal mounting means is designated by the reference numeral 38C and comprises a frictional universal joint type of connection allowing frictional pivotal readjustment of the second glare shield 28C in virtually any direction. This feature may be employed in the first form of the invention, the second form of the invention, the third form of the invention, or in any other modifications thereof, if desired. Parts of this modification which correspond to those previously described are indicated by similar reference numerals, followed by the letter "C," however.

Figure 9:
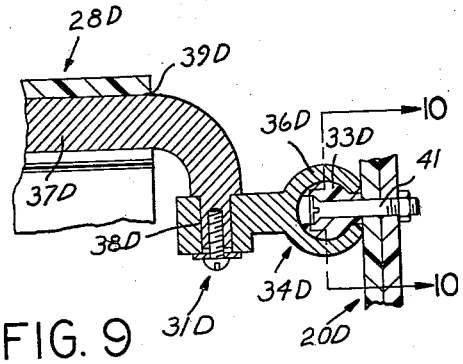
FIG. 9 is a view similar to FIG. 4, but illustrates a modification of the version of the invention illustrated in FIG. 4 wherein the projecting track means is of a type adapted to be removably attached to a pre-existing glare shield already mounted in an automobile rather than to be pre-manufactured therewith in the manner of the earlier form of the invention shown in FIGS. 4 and 5.
Figure 10:
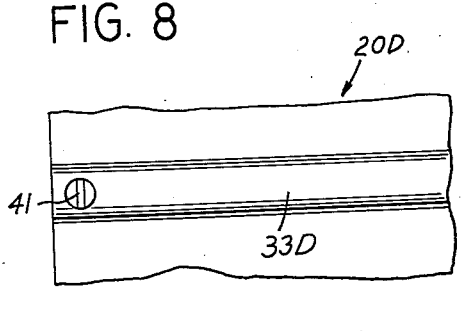
FIG. 10 is a view, partly in section and partly in elevation, taken in the direction of the arrows 10—10 of FIG. 9.

FIGS. 9 and 10 illustrate a slight modification of the form of the invention illustrated in FIGS. 4 and 5, wherein a separate projecting track means 33D is provided with fastening means 41 for fastening it on the surface of a pre-existing conventional sun visor glare shield, such as is indicated at 20D, whereby to then be adapted to slidably frictionally receive the engaging and encompassing track follower means 36D comprising the slidable engaging means 34D in a manner similar to that illustrated in FIGS. 4 and 5, and described hereinbefore in connection with a premanufactured first or main glare shield 20A having such a projecting track means 33A. This modified arrangement shown in FIGS. 9 and 10 makes it possible for a person to buy a kit inclding the projecting track means 33D, the attachment or fastening means 41 and the rest of the adjustable mounting means for connecting a second glare shield to the first glare shield in a manner analogous to that previously described and illustrated. Parts of this modification which correspond to those previously described are indicated by similar reference numerals, followed by the letter "D," however.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Vehicle sun visor means having a main shield mounting a longitudinally slidingly positionally adjustable auxiliary shield, comprising: mounting bracket means adapted to be fastened to a vehicle in the region of a junction of upper adjacent corners of a front and one side window of the vehicle; a main glare shield having a first end and a second end; means for adjustably rotatively mounting about a vertical axis and about a horizontal axis said main glare shield with respect to said mounting bracket means; an auxiliary glare shield having a first end and a second end; and means for adjustably rotatively and longitudinally slidingly mounting said auxiliary glare shield for controllably positionable adjustment with respect to said main glare shield along a longitudinal junction line extending along the length of said main glare shield between said first and second ends thereof, said means for adjustably rotatively and longitudinally slidably mounting said auxiliary glare shield with respect to said main glare shield including longitudinal junction means carried by one surface of said main glare shield on one side thereof along the length thereof between opposite ends thereof in a location spaced between top and bottom edges of said main glare shield, and additionally including slidable engagement means in slidable engagement therewith and pivotally connected to said auxiliary glare shield at one end and along the length thereof in a manner supporting said auxiliary glare shield in outwardly projecting relationship with respect to said surface of said main glare shield in a plane intersecting said surface of said main glare shield and having a component normal thereto; said slidable engagement means and said longitudinal junction means slidably engaged therewith including means for preventing relative rotation thereof around a longitudinal axis coincident with said longitudinal junction means; said longitudinal junction means comprising longitudinal slotted aperture-defining means having a longitudinal slot therealong facing outwardly away from said surface of said main glare shield in a plane having a component normal to said surface of said main glare shield; said slidable engagement means comprising an insert member slidably positioned in said slotted aperture-defining means and provided with an extension arm extending outwardly therefrom in a direction having a component normal to said surface of said main glare shield and provided with pivot means pivotally attaching said extension arm to said insert member for pivotal movement around an axis perpendicular to said extension arm and perpendicular to the longitudinal direction of said main glare shield, said extension arm adjustably rotatively and longitudinally slidably carrying said auxiliary glare shield along the length thereof and adjacent to the top thereof for rotation of said auxiliary glare shield, along the length thereof, around said extension arm and for longitudinal slidable movement of said auxiliary glare shield toward and away from said surface of said main glare shield in a direction having a component normal thereto.

2. Vehicle sun visor means having a main shield mounting a slidingly positionally adjustable auxiliary shield, comprising: a main glare shield; means for adjustably mounting said main glare shield with respect to a desired portion of a vehicle adjacent to window means thereof; an auxiliary glare shield; and means for adjustably mounting said auxiliary glare shield for controllably positionable adjustment with respect to said main glare shield along a junction line extending along said main glare shield between opposite ends thereof, said means for adjustably mounting said auxiliary glare shield with respect to said main glare shield comprising first and second portions, with said first portion including longitudinal junction means carried by one surface of said main glare shield on one side thereof along the length thereof in a location spaced between top and bottom edges of said main glare shield, and with said second portion including slidable engagement means in slidable engagement therewith and pivotally connected to said auxiliary glare shield in a manner supporting it in outwardly projecting relationship with respect to said surface of said main glare shield in a plane intersecting said surface of said main glare shield and having a component normal thereto; said longitudinal junction means comprising longitudinal slotted aperture-defining means having a longitudinal slot therealong facing outwardly away from said surface of said main glare shield in a plane having a component normal to said surface of said main glare shield, said slidable engagement means comprising an insert member slidably positioned in said slotted aperture-defining means and provided with an extension arm extending outwardly therefrom in a direction having a component normal to said surface of said main glare shield and provided with pivot means pivotally attaching said extension arm to said insert member for pivotal movement around an axis perpendicular to said extension arm and perpendicular to the longitudinal direction of said main glare shield, said extension arm adjustably rotatively and longitudinally slidably carrying said auxiliary glare shield for rotation of said auxiliary glare shield, along the length thereof, around said extension arm and for longitudinal slidable movement of said auxiliary glare shield toward and away from said surface of said main glare shield in a direction having a component normal thereto.

3. Vehicle sun visor means having a main shield mounting a slidingly positionally adjustable auxiliary shield, comprising: a main glare shield; means for adjustably mounting said main glare shield with respect to a desired portion of a vehicle adjacent to window means thereof; an auxiliary glare shield; and means for adjustably mounting said auxiliary glare shield for controllably positionable adjustment with respect to said main glare shield along a junction line extending along said main glare shield between opposite ends thereof, said means for adjustably mounting said auxiliary glare shield with respect to said main glare shield comprising first and second portions, with said first portion including longitudinal junction means carried by one surface of said main glare shield on one side thereof along the length thereof in a location spaced between top and bottom edges of said main glare shield, and with said second portion including slidable engagement means in slidable engagement therewith and pivotally connected to said auxiliary glare shield in a manner supporting it in outwardly projecting relationship with respect to said surface of said main glare shield in a plane intersecting said surface of said main glare shield and having a component normal thereto; said longitudinal junction means comprising longitudinal outwardly projecting track means lying in a plane substantially normal to said surface of said glare shield, said slidable engagement means comprising encompassing track follower means slidably positioned on said track means and provided with an extension arm extending outwardly therefrom in a direction having a component normal to said surface of said main glare shield and provided with pivot means pivotally attaching said extension arm to said track follower means for pivotal movement around an axis perpendicular to said extension arm and perpendicular to the longitudinal direction of said main glare shield, said extension arm adjustably rotatively and longitudinally slidably carrying said auxiliary glare shield for rotation of said auxiliary glare shield, along the length thereof, around said extension arm and for longitudinal slidable movement of said auxiliary glare shield toward and away from said surface of said main glare shield in a direction having a component normal thereto.

4. Vehicle sun visor means having a main shield mounting a longitudinally slidingly positionally adjustable auxiliary shield, comprising: mounting bracket means adapted to be fastened to a vehicle in the region of a junction of upper adjacent corners of a front and one side window of the vehicle; a main glare shield having a first end and a second end; means for adjustably rotatively mounting about a vertical axis and about a horizontal axis said main glare shield with respect to said mounting bracket means; an auxiliary glare shield having a first end and a second end; and means for adjustably rotatively and longitudinally slidingly mounting said auxiliary glare shield for controllably positionable adjustment with respect to said main glare shield along a longitudinal junction line extending along the length of said main glare shield between said first and second ends thereof, said means for adjustably rotatively and longitudinally slidably mounting said auxiliary glare shield with respect to said main glare shield including longitudinal junction means carried by one surface of said main glare shield on one side thereof along the length thereof between opposite ends thereof in a location spaced between top and bottom edges of said main glare shield, and additionally including slidable engagement means in slidable engagement therewith and pivotally connected to said auxiliary glare shield at one end and along the length thereof in a manner supporting said auxiliary glare shield in outwardly projecting relationship with respect to said surface of said main glare shield in a plane intersecting said surface of said main glare shield and having a component normal thereto; said slidable engagement means and said longitudinal junction means slidably engaged therewith including means for preventing relative rotation thereof around a longitudinal axis coincident with said longitudinal junction means; said longitudinal junction means comprising longitudinal outwardly projecting track means lying in a plane substantially normal to said surface of said glare shield, said slidable engagement means comprising encompassing track follower means slidably positioned on said track means and provided with an extension arm extending outwardly therefrom in a direction having a component normal to said surface of said main glare shield and provided with pivot means pivotally attaching said extension arm to said track follower means for pivotal movement around an axis perpendicular to said extension arm and perpendicular to the longitudinal direction of said main glare shield, said extension arm adjustably rotatively and longitudinally slidably carrying said auxiliary glare shield along the length thereof and adjacent to the top thereof for rotation of said auxiliary glare shield, along the length thereof, around said extension arm and for longitudinal slidable movement of said auxiliary glare shield toward and away from said surface of said main glare shield in a direction having a component normal thereto.

5. Vehicle sun visor means having a main shield mounting a slidingly positionally adjustable auxiliary shield, comprising: a main glare shield; means for adjustably mounting said main glare shield with respect to a desired portion of a vehicle adjacent to window means thereof; an auxiliary glare shield, and means for adjustably mounting said auxiliary glare shield for controllably positionable adjustment with respect to said main glare shield along a junction line extending along said main glare shield, said means for adjustably mounting said auxiliary glare shield with respect to said main glare shield comprising first and second portions, with said first portion including longitudinal junction means carried by one surface of said main glare shield on one side thereof along the length thereof in a location spaced between top and bottom edges of said main glare shield, and with said second portion including slidable engagement means in slidable engagement therewith and pivotally connected to said auxiliary glare shield in a manner supporting it in outwardly projecting relationship with respect to said surface of said main glare shield and having a component normal thereto; said slidable engagement means and said longitudinal junction means slidably engaged therewith including means for preventing relative rotation thereof around a longitudinal axis coincident with said longitudinal junction means; one of said first and second portions of said adjustable mounting means comprising a longitudinally slotted aperture-defining means having a longitudinal slot facing outwardly and lying in a plane having a component normal to said surface of said main glare shield, and the other of said portions of said adjustable mounting means comprising a projecting insert member relatively slidably positioned within said slotted aperture-defining means for relative longitudinal sliding movement in a longitudinal plane having a component normal to said surface of said main glare shield, said second portion of said adjustable mounting means taking the form of said slidable engagement means being provided with an extension arm extending outwardly therefrom in a direction having a component normal to said surface of said main glare shield and provided with pivot means pivotally attaching said extension arm with respect to said slidable engagement means for pivotal movement around an axis substantially perpendicular to said extension arm and to the longitudinal direction of said main glare shield, said extension arm adjustably rotatively and longitudinally slidably carrying said auxiliary glare shield for rotation of said auxiliary glare shield, along the length thereof, around said extension arm, and for longitudinal slidable movement of said auxiliary glare shield toward and away from said surface of said main glare shield in a direction having a component normal thereto.

References Cited in the file of this patent

UNITED STATES PATENTS

| | | |
|---|---|---|
| 2,038,906 | Ruhland | Apr. 28, 1936 |
| 2,054,325 | Jacobs | Sept. 15, 1936 |
| 2,257,612 | Lininger | Sept. 30, 1941 |
| 2,815,978 | Sandberg | Dec. 10, 1957 |
| 2,894,576 | Williams | July 14, 1959 |

FOREIGN PATENTS

| | | |
|---|---|---|
| 509,335 | Italy | Jan. 13, 1955 |
| 567,958 | Great Britain | Mar. 9, 1945 |